(No Model.) 2 Sheets—Sheet 1.
E. R. POWELL.
APPARATUS FOR THE TREATMENT OF MILK FOR THE MANUFACTURE OF BUTTER AND CHEESE.
No. 275,264. Patented Apr. 3, 1883.
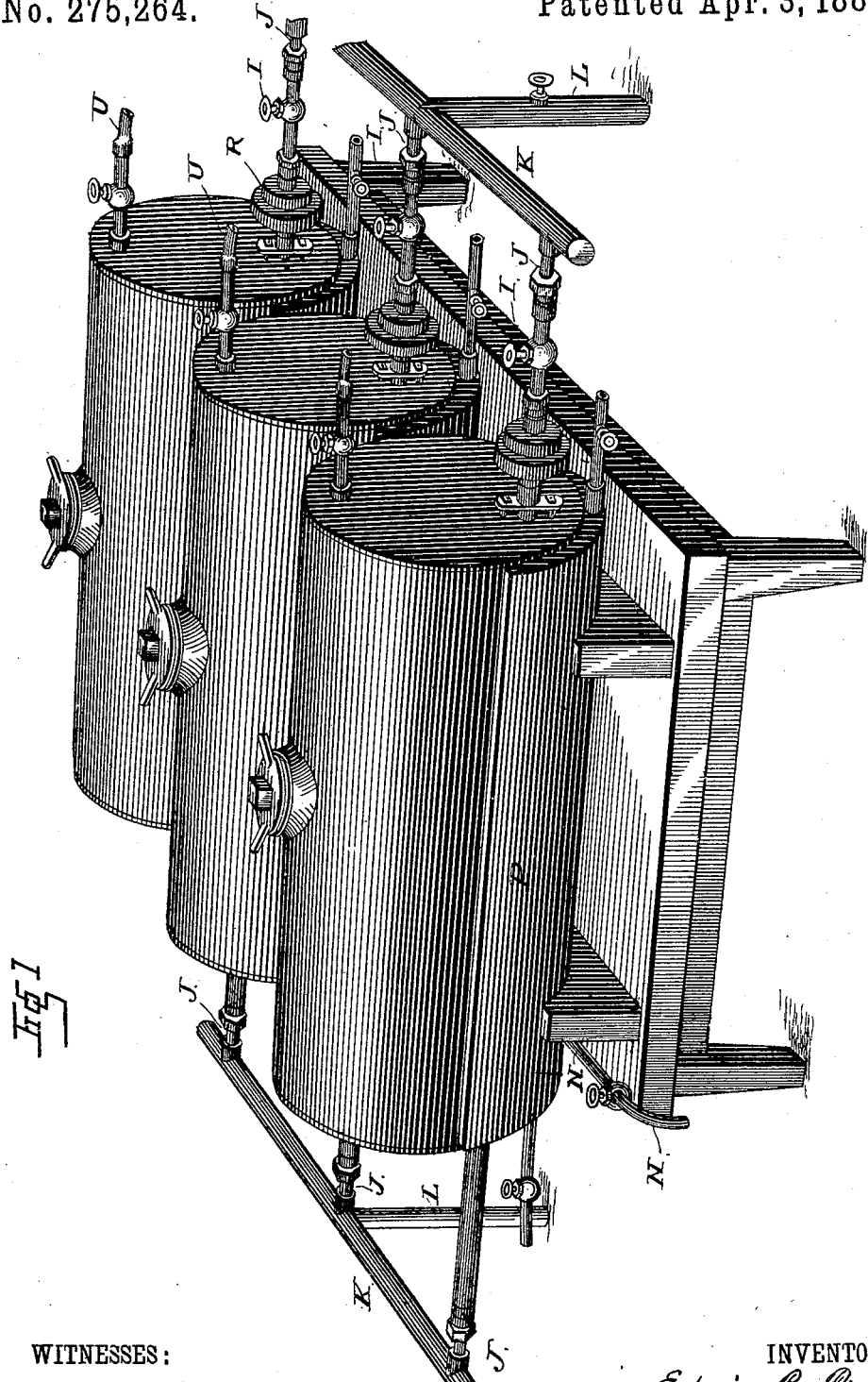
WITNESSES:
INVENTOR,
Edwin R. Powell,
per Charles E. Allen
ATTORNEYS

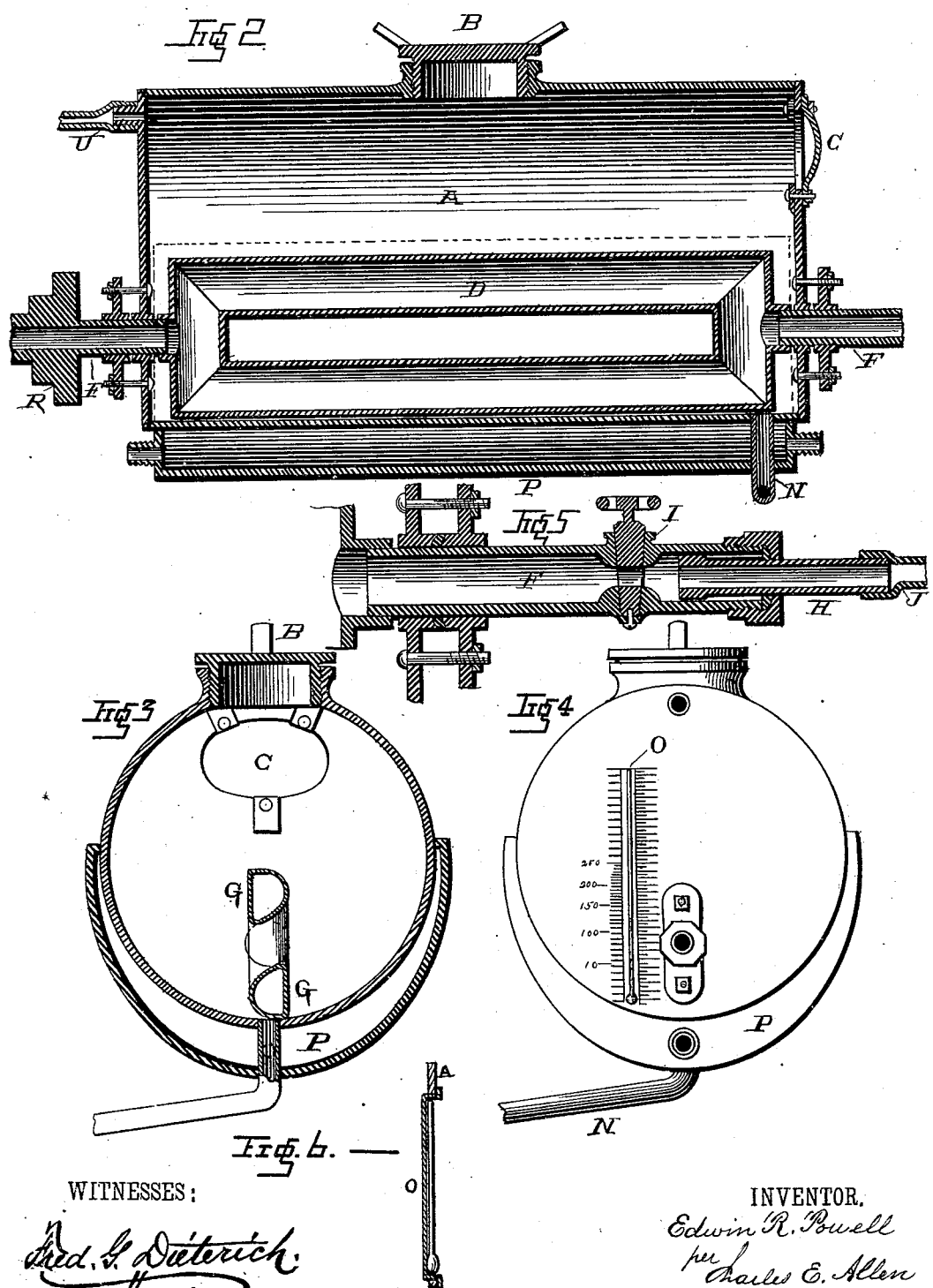

UNITED STATES PATENT OFFICE.

EDWIN R. POWELL, OF BURLINGTON, VERMONT.

APPARATUS FOR THE TREATMENT OF MILK FOR THE MANUFACTURE OF BUTTER AND CHEESE.

SPECIFICATION forming part of Letters Patent No. 275,264, dated April 3, 1883.

Application filed January 13, 1883. (No model.)

*To all whom it may concern:*

Be it known that I, EDWIN R. POWELL, a citizen of the United States, residing at the city of Burlington, in the county of Chittenden and State of Vermont, have invented certain new and useful Improvements in Apparatus for the Treatment of Milk for the Manufacture of both Butter and Cheese, of which the following is a specification, reference being had therein to the accompanying drawings.

My invention relates to an improvement in apparatus for the treatment of milk for the manufacture of both butter and cheese from the same milk; and it consists, first, in the combination of a suitable tank in which the milk is placed, a hollow revolving dasher, which is journaled therein, and connected to supply-pipes with flexible pipes at its ends, whereby the tank is adapted to be raised or tilted at one end, so as to cause the butter to be gathered at the opposite one; second, in the combination of the tank into which the milk is run, and revolving dasher, which is journaled in the tank, and which has suitable pipes connected to each of its ends, and sliding couplings placed in the pipes for the purpose of allowing the tank to be tilted up at one of its ends, for the purpose of throwing all of the butter and buttermilk down to that end of the tank from which it is to be removed; third, in the combination of a tank to receive the milk, provided with an opening to allow the milk to be poured in and the butter to be taken out, with a hollow revolving dasher through which steam, hot or cold water can be passed, and suitable couplings to connect the dasher with the supply and exit pipes, the tank being connected to an exhausting medium, so as to form a vacuum over the top of the milk while the cream is being raised.

The object of my invention is to churn the cream and produce the butter in the same tank in which the cream was raised, without exposing the cream to the action of the atmosphere unnecessarily, and thus effect a great saving in time, labor, and expense of transferring the cream to a churn for the purpose of churning it.

Figure 1 is a perspective view of an apparatus embodying my invention complete. Fig. 2 is a vertical longitudinal view of one of the tanks by itself. Fig. 3 is a vertical cross-section of the same. Fig. 4 is an end view of the tank, and Fig. 5 is a large detailed view of the pipes and couplings. Fig. 6 is a detail view, showing the glass and thermometer.

A represents a suitable tank, of any desired shape, size, or construction that may be preferred, and which may be used in either a horizontal or vertical position, as may be preferred. Through the top of the tank is made a suitable opening, which is closed by the removable cover B, and through which opening the milk is introduced into the tank. Through one end of the tank is also made a suitable man-hole, C, of any desired size, shape, or construction that may be preferred, and which is adapted to form an air-tight joint with the end of the cylinder, so that no air can get into the tank while the vacuum is being formed. Through this man-hole C, after the churning is done, the butter will be taken out. In each one of the tanks is journaled a hollow revolving dasher, D, which will be made long enough to extend nearly from one end of the tank to the other, and which will be made wide enough to extend any desired distance across the tank. This dasher or float is journaled air-tight by means of the revolving connecting-pipes F, which pass through the heads of the tank at a suitable distance below its center. By thus placing the dasher in the bottom of the tank the dasher is made to operate more effectively in cooling the milk from the bottom, and is in position to act upon however small a quantity of milk that may be placed in the tank. As will be seen, this hollow dasher consists of pipes or sections which are connected together at their ends, and which are provided with the flat sides G, so that while the dasher is being made to revolve this flat side will strike the cream and cause a greater concussion, and thus break up a larger number of the fatty globules, than could be done by any other shape. The pipes F, which are connected to each end of the revolving hollow dasher, are packed air and water tight where they pass through the ends of the tank, as shown in Fig. 2, and in the outer end of each of the pipes, at both ends of the tank, is placed a sliding coupling, H, which is packed perfectly tight, as shown in Fig. 5. The hollow dasher and the pipes F are connected together, so as to form practically one piece, and they are made to revolve in the tank, while the coupling H remains stationary. In the pipes F, at one end of the tank, where the hot or cold water or steam is to be admitted, are placed suitable cocks, I, by means of which the passage of the water or steam can be controlled at will. The outer ends of the couplings H, at both ends of the tank, are connected by means of short flexible tubes J with the stationary pipes K L, through which the hot and cold water or steam are introduced into the dashers and carried off therefrom. In the pipe L, through which the water or steam is introduced, there will be placed a suitable stop-cock for regulating the flow of the water or steam. The short rubber couplings J are interposed between the pipes H, which have a sliding movement in the outer ends of the pipes F and the stationary pipes K, so as to adapt the tanks to be raised upward at one end, for the purpose of running all of the butter and milk in the tank after the churning is finished down to that end of the tank which is provided with the man-hole C, so that the butter can be readily removed therefrom through the man-hole and the buttermilk run off through the pipe N. When the tank is raised upward at one end, the coupling at the end that is lowered is forced inward into the pipe F, while the coupling H at the end of the tank that is raised upward will be drawn far enough out of its pipe F to allow the tank to be readily tilted.

In order to determine not only the quantity of milk and cream, or cream alone, that may be contained in the tank, and also the temperature of the milk, there is secured in one end of the tank a suitable glass, O, which will extend a suitable distance above the center of the tank. Inside of this glass O is placed a thermometer, which will be secured inside of the glass in any suitable manner, as shown in Fig. 6, and which will indicate the temperature of the milk or cream in the tank. Upon the side of the glass is a suitable scale, which will indicate the amount of milk or cream in the tank either in gallons or pounds, as may be desired.

Surrounding the lower portion of each tank is a suitable jacket, P, in which either hot or cold water, steam, or compressed air may be passed, for the purpose of assisting in raising the temperature of the milk or in lowering its temperature after it has been raised to a desired point. This jacket will be specially used for assisting in lowering the temperature of the milk; but it may be used either for raising or lowering the temperature of the milk, or both.

The operation of my invention is as follows: A suitable quantity of milk fresh from the cows is placed in the tank A and the cover B and man-hole C closed. Hot water or steam is then passed through the hollow revolving dashers D, which may be made to move with greater or less rapidity by means of a belt, which is passed around the cone-pulley R, which is placed upon the pipe F at one end of the tank. While the temperature of the milk is being raised the belt is shifted upon the cone-pulley, so as to revolve the dashers D very slowly, and thus avoid breaking any of the larger fatty globules while the temperature is being raised. After the temperature of the milk has been raised to about 110° the cover B and man-hole C are fastened air-tight, and then suitable suction-pumps, which are connected to the tanks by means of the flexible tubes U, are worked so as to cause a vacuum in each tank. At the same time that the vacuum is being formed the flow of the hot water or steam through the revolving dashers is stopped, and then cold water or any other suitable cooling medium is started through the dashers, which are turned so as to be as near the bottom of the tank as possible, and there remain stationary, so that the cooling effect will first take place at the bottom of the tank. The temperature of the milk is raised for the purpose of expanding it and withdrawing from the milk all those vapors and impurities which naturally exist in it. The cooling of the milk is done at the bottom of the tank for the purpose of assisting in the raising of the cream to the top of the milk. The length of time the vacuum is maintained depends upon the depth of the milk, but after the cream has been raised the milk is drawn off through the pipe N into the cheese-vat, the cream being retained in the tank. The operator, by watching through the glass tube or column O, can readily determine when the milk has been drawn off, and then stop the outward flow, and thus prevent the liability of any of the cream being carried off with the milk. The belt is then shifted upon that part of the cone-pulley R which will give a rapid movement to the pipes F and the hollow dashers D, when the churning of the cream, which was retained in the tank in which it was raised, takes place. As soon as the dashers are started into operation for the purpose of churning the cream, which has been reduced to a temperature of about 40°, steam or hot water is admitted to the dashers, so that at the same time that the churning is being done the temperature of the cream is being raised. As soon as the temperature of the cream reaches the desired point for churning, the steam or hot water is shut off, and the churning alone proceeds. When the fatty globules of the cream begin to break, cold water is passed through the revolving dashers D, so as to lower the temperature of the cream to a suitable point, and thus render the butter, when formed, hard and firm. If the temperature of the cream was not reduced after it had been raised to the churning-point, the butter when formed would be soft and undesirable in character. It will be seen that by means of this hollow revolving dasher the temperature of the cream can be controlled at the will of the operator, without having to introduce water, ice, or any impurity, which would be detrimental to the milk in making good cheese. As soon as the butter begins to form into small lumps, one end of the tank is slowly raised, by means of a screw, lifting-jack, or other suitable means, so as to gradually carry the butter down toward that end of the tank which is provided with the man-hole C, from which point the butter is removed from the tank. The buttermilk is then drawn off through the pipe N into the cheese-vat, and used in the manufacture of the cheese. As the cream has been treated in the tank without being brought unnecessarily in contact with the atmosphere, the buttermilk is not soured or deteriorated in quality in any way, and is practically as well adapted for making cheese as the milk which was removed from the tank before the cream was churned.

It will be seen that the cream is raised, the milk prepared for making cheese, and the cream churned in the same tank without having to remove the cream to a churn, and thus an immense amount is saved in labor, time, and expense in the treatment of the milk.

I am aware that a stationary vertical vessel having a flexible tube attached at its extreme lower end with sliding coupling has been placed in a vertical tank of milk for the purpose of receiving a cooling medium, and this I disclaim.

Having thus described my invention, I claim—

1. The combination of a suitable tank, in which the milk is placed, a hollow revolving dasher, which is journaled therein, and connected with flexible pipes to pipes K L, whereby the tank is adapted to be raised or tilted at one end, so as to cause the butter to be gathered at the opposite one, substantially as described.

2. The combination of a suitable tank for receiving the cream, a suitable revolving dasher and pipes connected thereto at both of its ends, sliding couplings which are connected with the pipes that are attached to the revolving dasher, and suitable flexible connections, J, for uniting the couplings with the pipes K L, substantially as set forth.

3. In an apparatus for the treatment of milk, the combination of a tank to receive the milk, provided with a suitable opening to allow the milk to be poured in and the butter to be removed, with a hollow revolving dasher through which hot or cold water can be forced, and suitable couplings to connect the dasher with the supply and exit pipes, the tank being connected to an exhausting medium, so as to form a vacuum over the top of the milk while the cream is being raised, substantially as specified.

In testimony whereof I affix my signature in presence of two witnesses.

EDWIN R. POWELL.

Witnesses:
CHARLES E. ALLEN,
THEODORE S. PECK.